United States Patent
Staffier et al.

(10) Patent No.: US 10,815,832 B2
(45) Date of Patent: Oct. 27, 2020

(54) LOAD TRANSFER IN TURBINE EXHAUST CASE

(71) Applicant: United Technologies Corporation, Farmington, CT (US)

(72) Inventors: Peter Staffier, Wilbraham, MA (US); Paul W. Palmer, South Glastonbury, CT (US); Anders C. Olson, Bloomfield, CT (US); Nicholas W. Kantany, Manchester, CT (US); Eric Baker, Vernon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 63 days.

(21) Appl. No.: 16/012,396

(22) Filed: Jun. 19, 2018

(65) Prior Publication Data

US 2019/0383170 A1  Dec. 19, 2019

(51) Int. Cl.
*F01D 25/24* (2006.01)
*F01D 25/00* (2006.01)
*F01D 25/30* (2006.01)

(52) U.S. Cl.
CPC ......... *F01D 25/243* (2013.01); *F01D 25/005* (2013.01); *F01D 25/30* (2013.01); *F05D 2220/32* (2013.01); *F05D 2240/14* (2013.01); *F05D 2300/17* (2013.01)

(58) Field of Classification Search
CPC ...... F01D 25/162; F01D 25/30; F01D 25/005; F01D 25/243
USPC ................................ 415/134, 135, 138, 139
See application file for complete search history.

(56) References Cited

U.S. PATENT DOCUMENTS

| 3,302,926 A * | 2/1967 | Bobo ...................... F01D 9/042 |
| | | 415/209.2 |
| 3,367,405 A * | 2/1968 | Addie ..................... F02C 7/105 |
| | | 165/9 |
| 4,260,331 A * | 4/1981 | Goodwin .............. F01D 5/3007 |
| | | 416/219 R |
| 4,314,793 A * | 2/1982 | DeTolla ................ F01D 11/005 |
| | | 415/135 |
| 4,478,551 A | 10/1984 | Honeycutt, Jr. et al. |
| 7,762,766 B2 * | 7/2010 | Shteyman ............. F01D 25/246 |
| | | 415/135 |
| 9,097,141 B2 * | 8/2015 | Paradis ................. F01D 25/243 |
| 9,133,769 B2 | 9/2015 | Hashimoto et al. |
| 9,822,669 B2 * | 11/2017 | Wiebe ..................... F01D 9/065 |
| 2010/0132376 A1 | 6/2010 | Durocher |
| 2016/0032780 A1 | 2/2016 | Grogg |
| 2016/0186614 A1 | 6/2016 | Paulino |

(Continued)

OTHER PUBLICATIONS

EP search report for EP19170247.1 dated Oct. 24, 2019.

*Primary Examiner* — Courtney D Heinle
*Assistant Examiner* — Andrew Thanh Bui
(74) *Attorney, Agent, or Firm* — Getz Balich LLC (57) ABSTRACT

A turbine exhaust case is provided for a gas turbine engine. This turbine exhaust case includes a first gas turbine engine exhaust case, a second gas turbine engine exhaust case, a strut and a fastener. The second gas turbine engine exhaust case includes a flange and a bracket. The strut is coupled to the first case and the second case. The fastener fastens the flange and the strut. The second gas turbine engine exhaust case is co-axial with the first gas turbine engine exhaust case. The strut contacts the bracket when the engine is powered-on.

17 Claims, 6 Drawing Sheets

(56) References Cited

U.S. PATENT DOCUMENTS

2016/0201490 A1    7/2016   Scott
2017/0130608 A1    5/2017   Wiebe
2017/0241291 A1*   8/2017   Boeck .................... C04B 35/80

* cited by examiner

LOAD TRANSFER IN TURBINE EXHAUST CASE

STATEMENT REGARDING FEDERALLY SPONSORED RESEARCH OR DEVELOPMENTS

This invention was made with Government support awarded by the United States. The Government has certain rights in this invention.

BACKGROUND

Engines, such as those which power aircraft and industrial equipment, may employ a compressor to compress air that is drawn into the engine and a turbine to capture energy associated with the combustion of a fuel-air mixture. An engine may include an exhaust section that exhausts gases resulting from the combustion. A turbine exhaust case (TEC) is a component of the exhaust section.

Figure 2A:
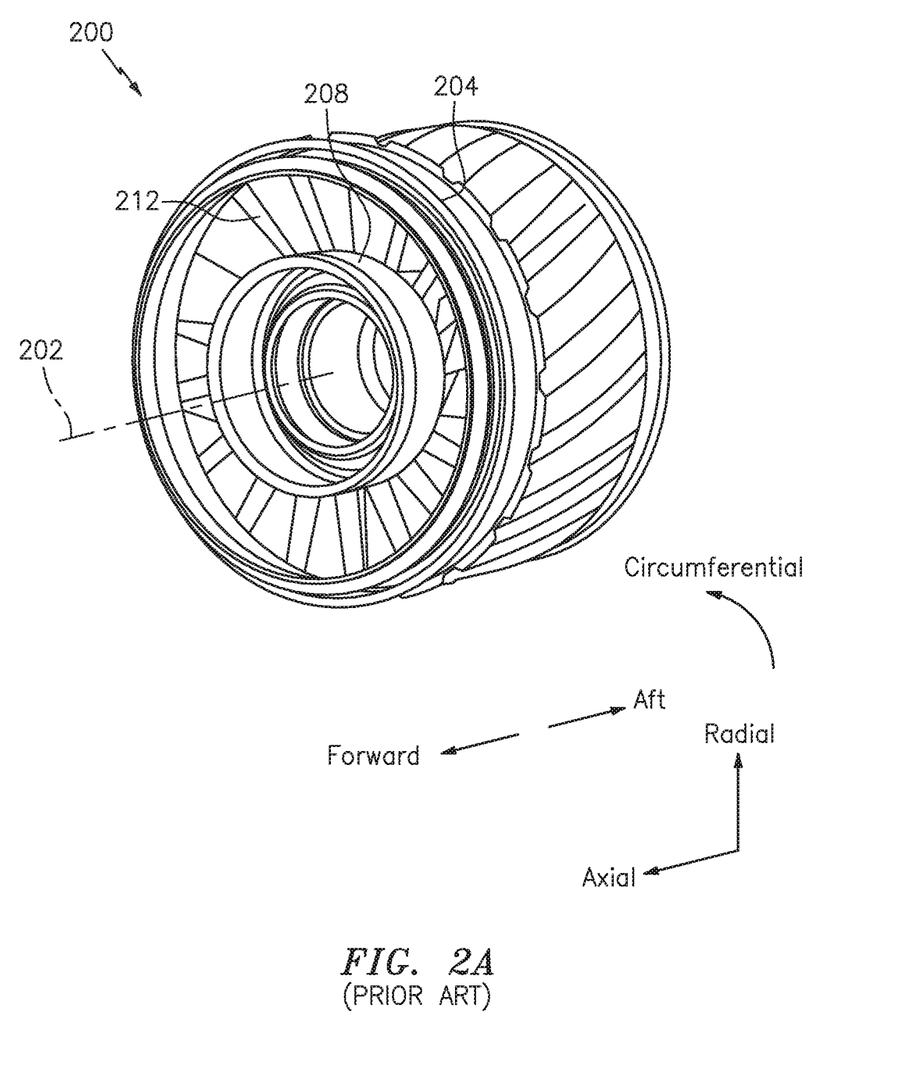
FIG. 2A illustrates a turbine exhaust case (TEC) in accordance with the prior art.

Referring to FIG. 2A, an example of a TEC 200 in accordance with the prior art is shown. The TEC 200 is shown as being arranged relative to an axial/longitudinal centerline 202 of an engine. Axial, radial, and circumferential directions are superimposed in FIG. 2A for reference purposes.

The TEC 200 includes a first case 204 and a second case 208. The second case 208 is radially inward of the first case 204, such that the second case 208 may be referred to as an inner case and the first case 204 may be referred to as an outer case. The first case 204 is co-axial with the second case 208 with respect to the centerline 202. Struts 212 that are distributed around the circumference of the TEC 200 couple the cases 204 and 208 to one another.

Figure 2B:
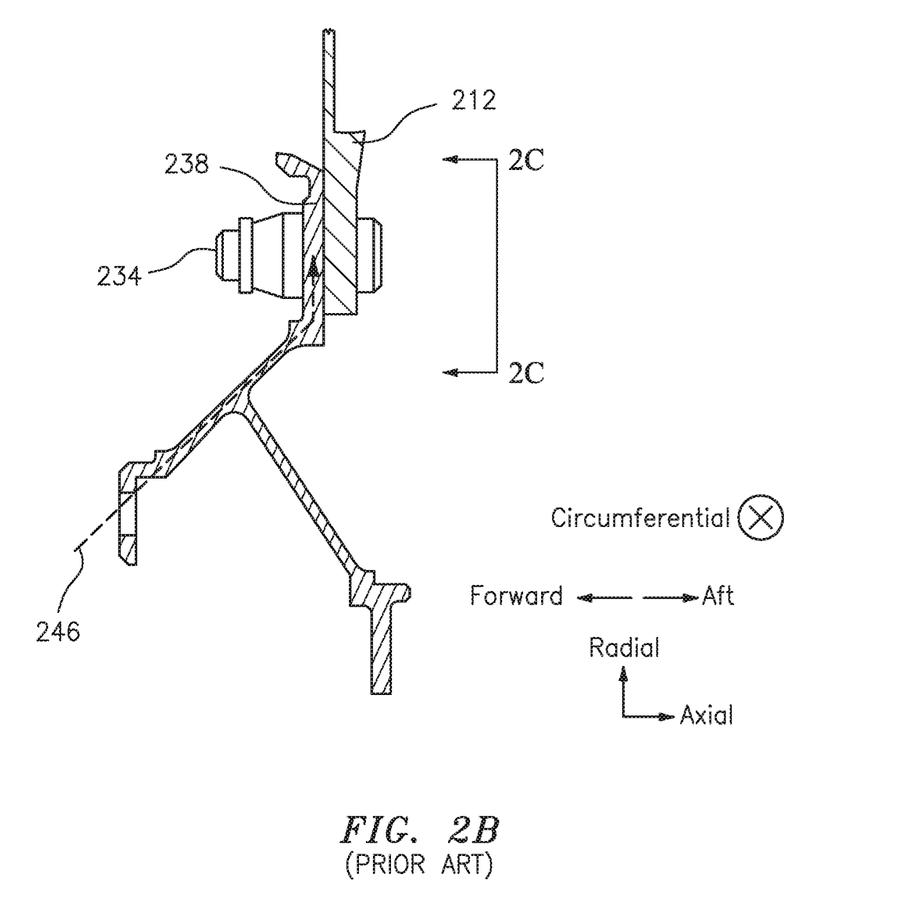
FIG. 2B illustrates an interface between an inner case and a strut of the TEC of FIG. 2A.
Figure 2C:
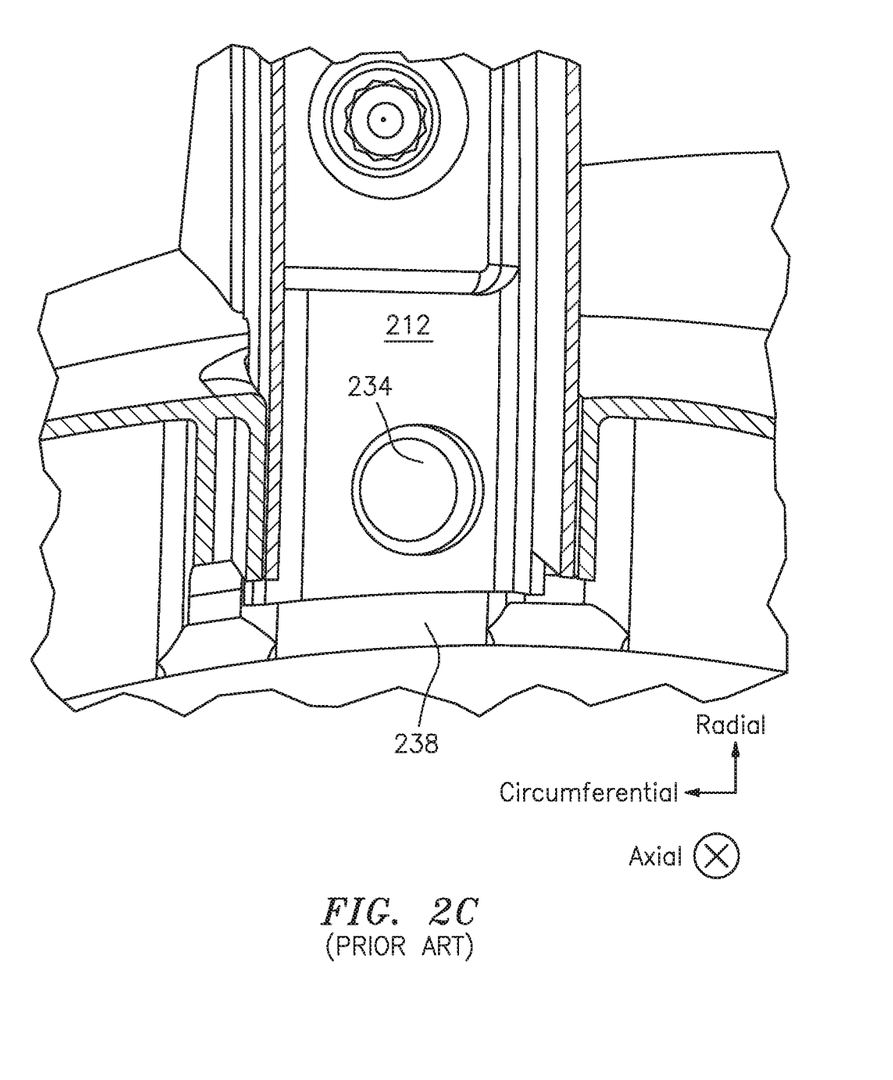
FIG. 2C illustrates the interface of FIG. 2B taken about the line 2C-2C of FIG. 2B.

Referring to FIGS. 2A-2C, a shear bolt 234 may be used to couple a flange 238 of the inner case 208 to a strut 212. The shear bolt 234 forms a part of a load path 246; e.g., the shear bolt 234 transfers load from the inner case flange 238 to the strut 212. The load includes a bearing load, e.g., a load associated with one or more bearings of the engine.

The loads that are accommodated/transferred by the shear bolt 234 are large. For example, the loads may be on the order of several thousand pounds. As a result, the shear bolt 234 must be sized to accommodate such large loads in order to maintain the structural and functional integrity of the shear bolt 234.

While effective in terms of increasing a load-handling capability, all other things being equal, increasing the size/footprint of the shear bolt 234 adds weight to the TEC 200. In some embodiments, it might not be possible to use a large shear bolt 234 due to package constraints (e.g., insufficient space may be available to accommodate a large shear bolt 234). Additionally, the inner case flange 238 may need to be larger than a threshold in terms of one or more dimensions (e.g., an axial thickness) to avoid compromising the structural or functional integrity of the inner case flange 238 due to load. Again, weight and/or packaging constraints may not allow for the use of a large inner case flange 238.

Accordingly, what is needed is an enhanced, cost-effective, and efficient ability for TEC hardware/components to accommodate/withstand load.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

According to an aspect of the present disclosure, a turbine exhaust case is provided for a gas turbine engine. This turbine exhaust case includes a first gas turbine engine exhaust case, a second gas turbine engine exhaust case, a strut and a fastener. The second gas turbine engine exhaust case includes a flange and a bracket. The strut is coupled to the first case and the second case. The fastener fastens the flange and the strut. The second gas turbine engine exhaust case is co-axial with the first gas turbine engine exhaust case. The strut contacts the bracket when the engine is powered-on.

According to another aspect of the present disclosure, a gas turbine engine is provided that is defined along a central longitudinal engine axis. This gas turbine engine includes a turbine section and an exhaust section located axially aft of the turbine section. The exhaust section includes an exhaust case. The exhaust case includes a first case, a second case, a strut and a fastener. The second case is co-axial with the first case and radially inward of the first case. The second case includes a flange and a bracket. The strut is coupled to the first case and the second case. The fastener fastens the flange and the strut. The strut contacts the bracket when the gas turbine engine is powered-on. The second case transfers a load to the strut as part of a load path when the gas turbine engine is powered-on. The load path bypasses the fastener.

A non-zero valued clearance may be present between the bracket and the strut when the engine is powered-off.

A second clearance between the fastener and the flange may be greater than the clearance between the bracket and the strut.

A second clearance between the fastener and the strut may be greater than the clearance between the bracket and the strut.

The second gas turbine engine exhaust case may be composed of cast nickel alloy. The strut may be composed of wrought nickel alloy.

The fastener may include a bolt and a nut.

The second gas turbine engine exhaust case may transfer a load to the strut. The load may bypass the fastener as part of the transfer.

A non-zero valued radial clearance may be present between the bracket and the strut when the gas turbine engine is powered-off.

A second radial clearance between the fastener and the flange may be greater than the radial clearance between the bracket and the strut.

A third radial clearance between the fastener and the strut may be greater than the radial clearance between the bracket and the strut.

The radial clearance may be less than or equal to 0.5 millimeters when the engine is powered-off. The second radial clearance may be greater than or equal to 0.7 millimeters and less than or equal to 0.9 millimeters. The third radial clearance may be greater than or equal to 0.7 millimeters and less than or equal to 0.9 millimeters.

The second case may be composed of cast nickel alloy. The strut may be composed of wrought nickel alloy. The fastener may include a threaded bolt and a clinch nut. The bracket may include sidewalls that circumferentially bound the strut and support the strut.

The bracket may be located radially inward of the strut.

The bracket may at least partially overlap axially with the strut.

The load may include a bearing load.

BRIEF DESCRIPTION OF THE DRAWINGS

The present disclosure is illustrated by way of example and not limited in the accompanying figures in which like reference numerals indicate similar elements. The figures are not necessarily drawn to scale unless explicitly indicated otherwise.

DETAILED DESCRIPTION

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with aspects of this disclosure, apparatuses, systems, and methods are described for transferring loads through one or more structures of an engine. For example, in some embodiments a bracket may be used to transfer one or more loads. The bracket may be designed and manufactured to satisfy durability and/or stiffness requirements while reducing (e.g., minimizing) weight.

Figure 1:
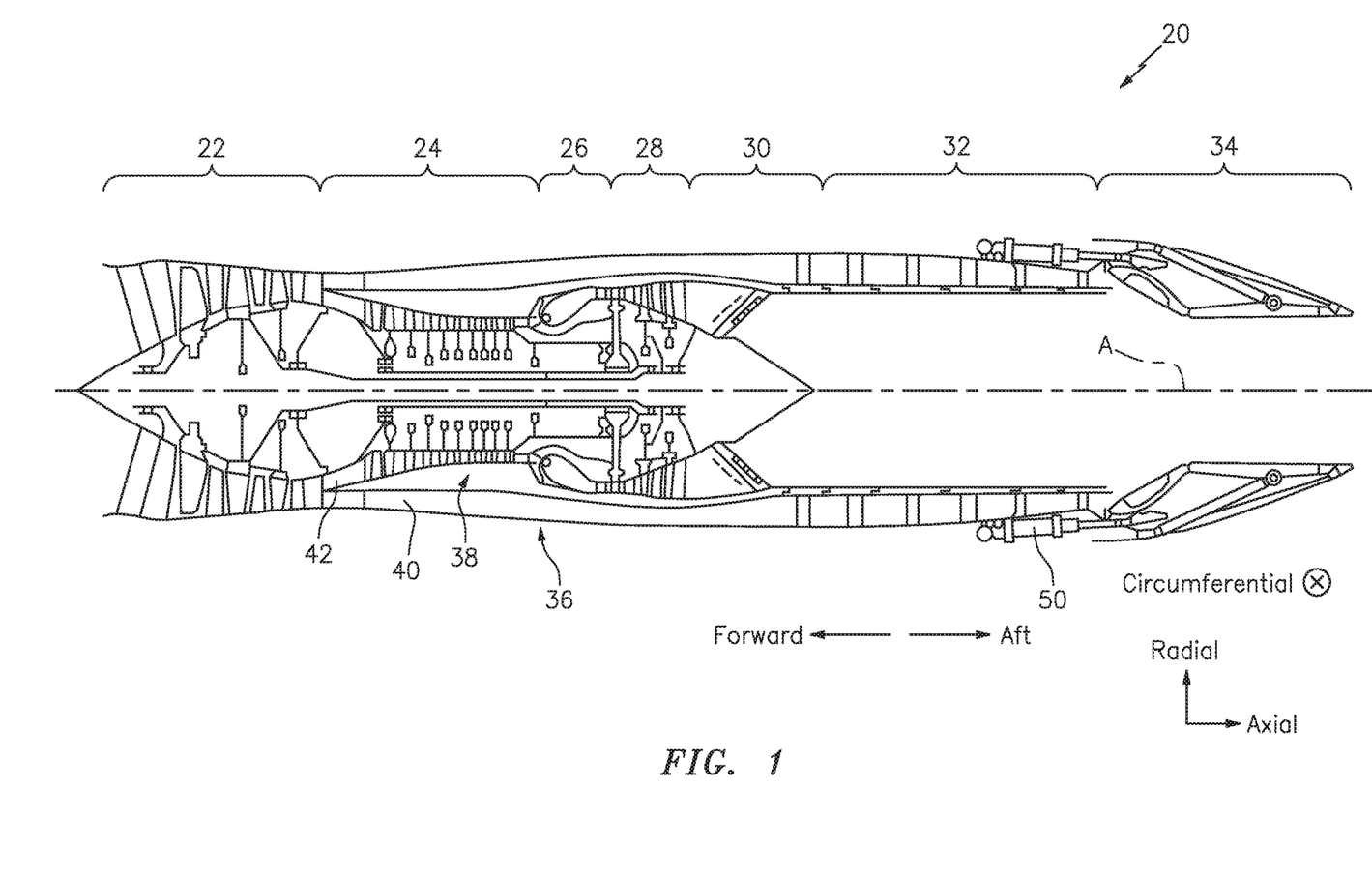
FIG. 1 is a side cutaway illustration of a gas turbine engine that incorporates an exhaust section.

FIG. 1 schematically illustrates a gas turbine engine 20. The gas turbine engine 20 is disclosed herein as a two-spool low-bypass augmented turbofan that generally incorporates a fan section 22, a compressor section 24, a combustor section 26, a turbine section 28, an augmenter section 30, an exhaust section 32, and a nozzle section 34 along a central longitudinal engine axis A.

An outer structure 36 and an inner structure 38 define a generally annular secondary airflow path 40 around a core primary airflow path 42. Various structures and modules may define the outer structure 36 and the inner structure 38. The outer structure 36 and/or the inner structure 38 may at least partially define an exoskeleton to support the rotational hardware contained therein.

Air that enters the fan section 22 is divided between a core primary airflow through the core primary airflow path 42 and a secondary airflow through a secondary airflow path 40. The core primary airflow passes through the combustor section 26, the turbine section 28, then the augmenter section 30 where fuel may be selectively injected and burned to generate additional thrust through the nozzle section 34.

The secondary airflow may be utilized for a multiple of purposes to include, for example, cooling and pressurization. The secondary airflow as defined herein is any airflow different from the core primary airflow. The secondary airflow may ultimately be at least partially injected into the core primary airflow path 42 adjacent to the exhaust section 32 and the nozzle section 34.

FIG. 1 represents one possible configuration for an engine. Aspects of the disclosure may be applied in connection with other environments, including additional configurations for gas turbine engines. Aspects of the disclosure may be applied in connection with geared or non-geared engines. Aspects of the disclosure may be applied in connection with one or more turbomachinery applications.

Figure 3A:
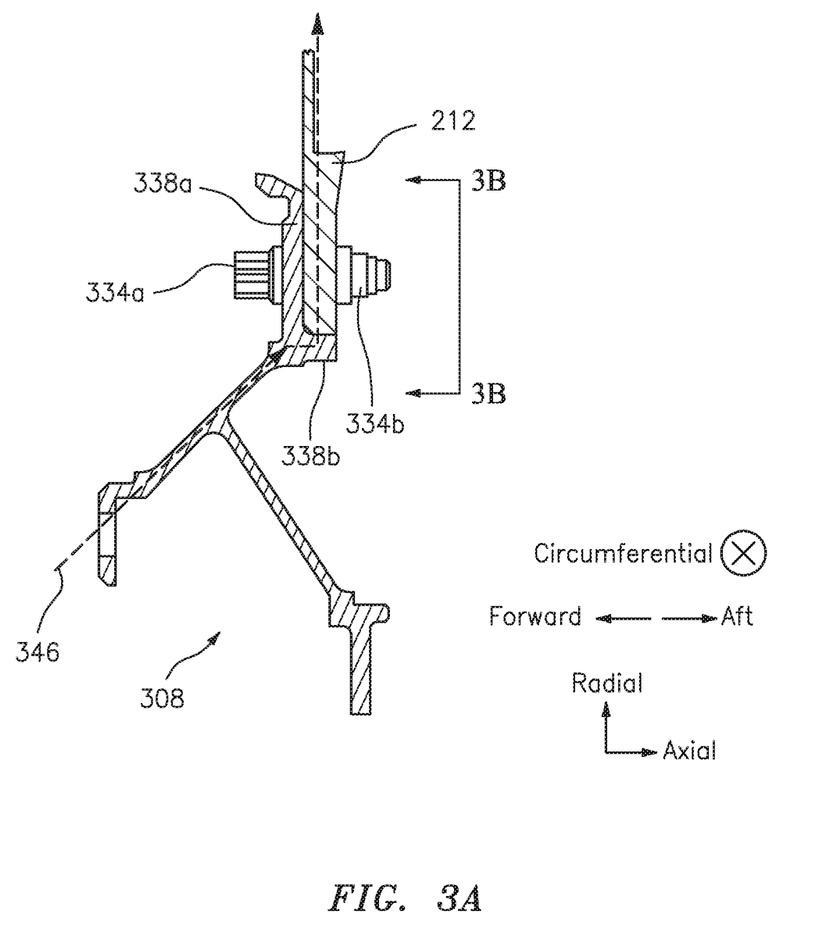
FIG. 3A illustrates an interface between an inner case and a strut of a TEC in accordance with aspects of this disclosure.

The exhaust section 32 may include a turbine exhaust case (TEC). As described above, a TEC may include one or more struts that may couple a first case and a second case, where the first case may be located radially outward/outboard of the second case. Referring to FIG. 3A, an interface between an inner case 308 and a strut 212 in accordance with aspects of this disclosure is shown. In particular, in FIG. 3A a strut 212 may be coupled (e.g., fastened) to an inner case flange 338a via a fastener. The fastener may include a bolt 334a (e.g., a threaded bolt) and a nut 334b (e.g., a clinch nut).

The inner case flange 338a may be coupled to a tab/bracket 338b. The inner case flange 338a and the bracket 338b may be integral structures of the inner case 308. In some embodiments, the inner case flange 338a may be formed via casting and the bracket 338b may be formed via one or more machining operations.

As shown in FIG. 3A, the bracket 338b may at least partially overlap axially with the strut 212 and be located radially inward/inboard of the strut 212. At least during engine operation (e.g., when the engine is powered-on), the strut 212 may contact the bracket 338b. As a result of such contact, load associated with a load path 346 may be transferred from the inner case to the strut 212 without traversing the fastener (e.g., the bolt 334a and nut 334b). Stated slightly different, the load may bypass the fastener in being transferred from the inner case to the strut. This may be contrasted with the load path 246 that incorporates the fastener/bolt 234 of FIG. 2B.

As a result of the fastener not being included as part of the load path 346 in FIG. 3A, additional opportunities are available in terms of the selection of the fastener. For example, and assuming comparable (e.g., equivalent) loads in FIGS. 2B and 3A, the fastener (e.g., bolt 334a/nut 334b) of FIG. 3A may be smaller than the shear bolt 234. Additionally, a dimension (e.g., an axial thickness) of the inner case flange 338a may be less than a (counterpart) dimension of the inner case flange 238.

As described above, the fastener of FIG. 3A may not form a part of the load path 346 (e.g., the load path 346 may bypass the fastener). Such a decoupling of the fastener from the load path 346 may be based at least in part on a size/dimension of a clearance/gap associated with the bolt 334a relative to a size/dimension of a clearance/gap between the strut 212 and the bracket 338b. For example, and referring to FIGS. 3A-3B, a (radial) gap 350 between a surface of the strut 212 and a surface of the bracket 338b may be sized to be (substantially) less than a gap 360 (where the gap 360 may represent a gap between the bolt 334a and the inner case flange 338a or a gap between the bolt 334a and the strut 212).

Figure 3B:
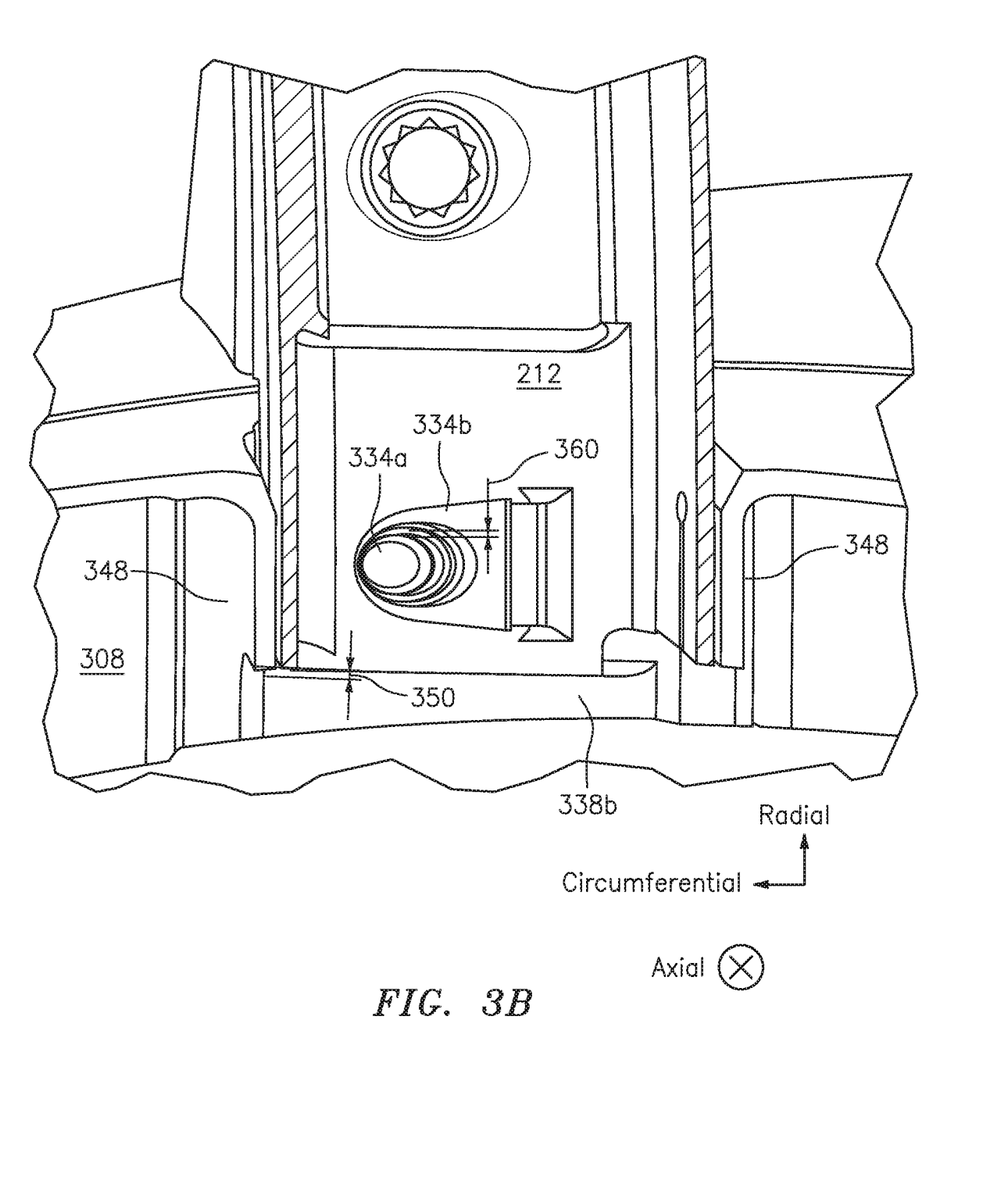
FIG. 3B illustrates the interface of FIG. 3A taken about the line 3B-3B of FIG. 3A.

In some embodiments, the gap 350 may be approximately 0 millimeters to 0.5 millimeters. In some embodiments, the gap 360 may be on the order of approximately 0.8 millimeters (e.g., the gap 360 may be a value within a range of 0.7 millimeters and 0.9 millimeters). Other values for the gap 350 and/or the gap 360 may be used in some embodiments. A value for the gap 350 and/or a value for the gap 360 may be based on one or more factors, such as for example manufacturing tolerances, thermal behavior (e.g., thermal expansion of a first component relative to a second component), etc.

Additionally, the strut 212 may be located directly within the gas path (and exposed to some of the highest temperatures associated with the gas path), whereas the inner and outer cases of the TEC may be (radially) distant from the hottest temperatures of the gas path. As a result, the strut 212 may tend to experience greater thermal expansion/growth relative to the inner and outer cases. To the extent that the gap 350 is a non-zero value when the engine is not being operated (e.g., when the engine is powered-off), the gap 350 may be driven/close to zero even at, e.g., low engine power operating conditions (e.g., an idle engine operating state). Stated slightly differently, the strut 212 may contact the bracket 338b when the engine is powered-on due to a difference in temperature of the strut 212 relative to the bracket 338b. A non-zero value of the gap 350 (when the engine is not operating/powered-off) may facilitate ease, e.g., in assembling or disassembling the engine, during inspection/maintenance/test procedures, etc.

As shown in FIG. 3B, the bracket 338b may include (radial) sidewalls 348. The sidewalls 348 may (circumferentially) bound the strut 212 and may provide structural support for the strut 212.

The components of a TEC may be composed of one or more materials. For example, a fastener and a case may include nickel alloy. In some embodiments, a strut may include wrought nickel alloy. In some embodiments, a case (e.g., an inner case) may include at least one of cast nickel alloy or wrought nickel alloy. Relative to wrought nickel alloy, cast nickel alloy is cheaper and provides less strength. For a given amount of load accommodation, aspects of the disclosure may facilitate the use of cast nickel alloy (whereas using conventional techniques, implementation of cast nickel alloy might not have been possible with the same load accommodation capability and the same footprint).

In accordance with aspects of this disclosure, a TEC of an engine may include one or more cases and one or more struts. A case may include one or more brackets, where a given bracket may seat/contact a strut during operation of the engine. The contact between the bracket and the strut may form a part of a load path to transfer load from, e.g., the bracket to the strut. In this respect, hardware (e.g., a fastener, a flange of the case, etc.) of the TEC might not be forced to bear/accommodate/withstand the load, providing for a reduction (e.g., minimization) in terms of a size/dimension/footprint of that hardware. Additionally, the use of a smaller footprint in terms of such hardware may reduce the weight of the engine, thereby promoting engine efficiency. Opportunities are also provided for using lower-grade, less expensive materials for one or more of the TEC components.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A turbine exhaust case for a gas turbine engine, comprising:
   a first gas turbine engine exhaust case;
   a second gas turbine engine exhaust case that includes a flange and a bracket;
   a strut coupled to the first case and the second case; and
   a fastener that fastens the flange and the strut;
   wherein the second gas turbine engine exhaust case is co-axial with the first gas turbine engine exhaust case;
   wherein the strut is configured to radially contact the bracket to provide a radial load path between the strut and the bracket during a first mode of gas turbine engine operation; and
   wherein a non-zero valued clearance is present between the bracket and the strut during a second mode of gas turbine engine operation.

2. The turbine exhaust case of claim 1, wherein a second clearance between the fastener and the flange is greater than the clearance between the bracket and the strut.

3. The turbine exhaust case of claim 1, wherein a second clearance between the fastener and the strut is greater than the clearance between the bracket and the strut.

4. The turbine exhaust case of claim 1, wherein the second gas turbine engine exhaust case is composed of cast nickel alloy, and wherein the strut is composed of wrought nickel alloy.

5. The turbine exhaust case of claim 1, wherein the fastener includes a bolt and a nut.

6. The turbine exhaust case of claim 1, wherein the second gas turbine engine exhaust case transfers a load to the strut, and wherein the load bypasses the fastener as part of the transfer.

7. A gas turbine engine defined along a central longitudinal engine axis, comprising:
   a turbine section; and
   an exhaust section located axially aft of the turbine section, the exhaust section including an exhaust case, wherein the exhaust case includes
   a first case;
   a second case that is co-axial with the first case and radially inward of the first case, wherein the second case includes a flange and a bracket;
   a strut coupled to the first case and the second case; and
   a fastener that fastens the flange and the strut;
   wherein the strut is configured to radially contact the bracket during a first mode of gas turbine engine operation;
   wherein the second case is configured to transfer a load radially to the strut through the bracket as part of a load path;
   wherein the load path bypasses the fastener; and
   wherein a non-zero valued radial clearance is present between the bracket and the strut during a second mode of gas turbine engine operation.

8. The gas turbine engine of claim 7, wherein a second radial clearance between the fastener and the flange is greater than the radial clearance between the bracket and the strut.

9. The gas turbine engine of claim 8, wherein a third radial clearance between the fastener and the strut is greater than the radial clearance between the bracket and the strut.

10. The gas turbine engine of claim 9, wherein the radial clearance is less than or equal to 0.5 millimeters during the second mode of gas turbine engine operation, and wherein the second radial clearance is greater than or equal to 0.7 millimeters and less than or equal to 0.9 millimeters, and wherein the third radial clearance is greater than or equal to 0.7 millimeters and less than or equal to 0.9 millimeters.

11. The gas turbine engine of claim 7, wherein the second case is composed of cast nickel alloy.

12. The gas turbine engine of claim 11, wherein the strut is composed of wrought nickel alloy.

13. The gas turbine engine of claim 7, wherein the fastener includes a threaded bolt and a clinch nut.

14. The gas turbine engine of claim 7, wherein the bracket includes sidewalls that circumferentially bound the strut and support the strut.

15. The gas turbine engine of claim 7, wherein the bracket is located radially inward of the strut.

16. The gas turbine engine of claim 15, wherein the bracket at least partially overlaps axially with the strut.

17. The gas turbine engine of claim 7, wherein the load includes a bearing load.

\* \* \* \* \*